(12) United States Patent
Mori

(10) Patent No.: US 6,879,501 B2
(45) Date of Patent: Apr. 12, 2005

(54) SWITCHING POWER SUPPLY

(75) Inventor: Yoshihiro Mori, Kyoto (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/754,604

(22) Filed: Jan. 12, 2004

(65) Prior Publication Data
US 2004/0264221 A1 Dec. 30, 2004

(51) Int. Cl.[7] .......................................... H02M 7/122
(52) U.S. Cl. ............................ 363/56.03; 323/21.11; 323/21.18; 323/97
(58) Field of Search ..................... 363/21.01, 21.04, 363/21.05, 21.07–21.11, 21.12, 21.13, 21.15–21.18, 56.01, 56.05, 56.09, 56.11, 97, 131

(56) References Cited
U.S. PATENT DOCUMENTS
5,412,556 A * 5/1995 Marinus ................. 363/21.05
5,825,638 A * 10/1998 Shutts ..................... 363/21.11

FOREIGN PATENT DOCUMENTS
JP          8-103075      4/1996
JP          2003-274844   9/2003

* cited by examiner

Primary Examiner—Gary L. Laxton
(74) Attorney, Agent, or Firm—Parkhurst & Wendel, L.L.P.

(57) ABSTRACT

The present invention provides a switching power supply which has an overcurrent protection characteristic with a small number of components. The switching power supply includes a regulator from a drain and an auxiliary winding VCC, a drain current detection circuit for detecting a current applied to a switching element, an oscillation circuit for outputting a clock signal of a constant frequency, a feedback signal control circuit for detecting a control signal from the secondary side and controlling current applied to the switching element, a clamping circuit for controlling the maximum value of current applied to the switching element, and a clamp voltage variable circuit for changing a clamp voltage of the clamping circuit and an oscillation frequency of the oscillation circuit according to a voltage of VCC.

7 Claims, 8 Drawing Sheets

SWITCHING POWER SUPPLY

FIELD OF THE INVENTION

The present invention relates to a switching power supply and particularly relates to a switching power supply for a charger that has a constant current drooping characteristic on a secondary output.

BACKGROUND OF THE INVENTION

FIG. 4 is a circuit diagram showing an example of a conventional switching power supply for a charger. In FIG. 4, reference numeral 130 denotes a semiconductor device for controlling a switching power supply (hereinafter, simply referred to as a semiconductor device). The semiconductor device 130 is constituted by a switching element 101 and a control circuit thereof.

The semiconductor device 130 has, as external input terminals, five terminals of the input terminal (DRAIN) of the switching element 101, an auxiliary power supply voltage input terminal (VCC), an internal circuit power supply terminal (VDD), a feedback signal input terminal (FB), and a GND terminal (GND) of the control circuit that serves as an output terminal of the switching element 101.

Reference numeral 102 denotes a regulator for providing the internal circuit power supply of the semiconductor device 130. The regulator 102 comprises a switch 102A for applying starting current to the VCC and a switch 102C for applying current from the VCC to the VDD.

Reference number 103 denotes a starting constant-current source for feeding starting circuit current. The constant current source feeds starting current to the VCC via the switch 102A upon startup.

Reference numeral 107 denotes a start/stop circuit for controlling start/stop of the semiconductor device 130. The start/stop circuit detects the voltage of the VCC and outputs a signal for stopping the switching operation of the switching element 101 to a NAND circuit 105 when the VCC has a voltage equal to or lower than a given voltage.

Reference numeral 106 denotes a drain current detection circuit for detecting a current applied to the switching element 101. The detection circuit 106 converts a detected current into a voltage signal and outputs the signal to a comparator 108.

Reference numeral 111 denotes a feedback signal control circuit which converts a current signal, which is inputted to the FB terminal, into a voltage signal and outputs the signal to the comparator 108.

The comparator 108 outputs a signal to the reset terminal of an RS flip-flop circuit 110 when an output signal from the feedback signal control 111 and an output signal from the drain current detection circuit 106 are equal to each other.

A clamping circuit 112 is a circuit for determining the maximum value of an output signal from the feedback signal control circuit 111. The clamping circuit 112 determines the maximum value of current applied to the switching element 101 and performs the function of overcurrent protection for the switching element 101.

Reference numeral 109 denotes an oscillation circuit which outputs a maximum duty cycle signal 109A for determining the maximum duty cycle of the switching element 101 and a clock signal 109B for determining an oscillation frequency of the switching element 101. The maximum duty cycle signal 109A is inputted to the NAND circuit 105 and the clock signal 109B is inputted to the set terminal of the RS flip-flop circuit 110.

The output signal of the start/stop circuit 107, the maximum duty cycle signal 109A, and the output signal of the RS flip-flop circuit 110 are inputted to the NAND circuit 105. The output signal of the NAND circuit 105 is inputted to a gate drive circuit 104 to control the switching operation of the switching element 101.

Reference numeral 140 denotes a transformer which has a primary winding 140A, a secondary winding 140C, a secondary auxiliary winding 140B, and a primary auxiliary winding 140D.

A rectifying/smoothing circuit constituted by a diode 131 and a capacitor 132 is connected to the primary auxiliary winding 140D, and is utilized as the auxiliary power supply of the semiconductor device 130. Input is made to the VCC.

Reference numeral 133 denotes a capacitor for stabilizing the VDD. Reference numeral 135 denotes a control signal transmission circuit for transmitting a control signal from the secondary side to the primary side. The transmission circuit 135 is constituted by a phototransistor 135A and a light-emitting diode 135B. The collector of the phototransistor 135A is connected to the VDD and the emitter of the phototransistor 135A is connected to the FB.

A rectifying/smoothing circuit constituted by a diode 152 and a capacitor 153 is connected to the secondary winding 140C. The rectifying/smoothing circuit is further connected to a load 157. A rectifying/smoothing circuit constituted by a diode 150 and a capacitor 151 is connected to the secondary auxiliary winding 140B and feeds current to the light-emitting diode 135B and a secondary control circuit 158.

The secondary control circuit 158 is constituted by a constant voltage control circuit 159 and a constant current control circuit 160. The constant voltage control circuit 159 is fed with voltage divided by detection resistors 154 and 155 of secondary output voltage Vo and controls current applied to the light-emitting diode 135B so as to have a constant secondary output voltage Vo. The constant current control circuit 160 operates when current applied to an output current detection resistor 156 becomes equal to or higher than a give current, and the constant current control circuit 160 controls current applied to the light-emitting diode 135B so as to have a constant output current Io.

Referring to FIGS. 4 and 5, the operations of the switching power supply configured thus will be described below. FIG. 5 is a time chart for explaining the operation waveforms of the above-described parts.

In FIG. 4, a direct-current voltage VIN generated by performing rectification and smoothing on, for example, a commercial alternating-current power supply is inputted to the input terminals. The VIN is applied to the DRAIN terminal of the semiconductor device 130 via the primary winding 140A of the transformer 140. Then, starting current generated by the starting constant-current source 103 is applied to charge the capacitor 132, which is connected to the VCC, via the switch 102A in the regulator 102, so that the voltage of the VCC is increased. The switch 102C in the regulator 102 operates such that the VDD has a constant voltage. Thus, some of the starting current charges the capacitor 133, which is connected to the VDD, via the switch 102C, so that the voltage of the VDD is also increased.

When the voltage of the VCC increases and reaches the starting voltage set by the start/stop circuit 107, the switching operation of the switching element 101 is started. When the switching operation is started, energy is supplied to the windings of the transformer 140 and thus current is applied to the secondary winding 140C, the secondary auxiliary winding 140B, and the primary auxiliary winding 140D.

Current applied to the secondary winding 140C is rectified and smoothed by the diode 152 and the capacitor 153 into direct-current power, which supplies power to the load 157. The output voltage Vo is gradually increased by repeating the switching operation. When the output voltage Vo reaches a voltage set by the output voltage detection resistors 154 and 155, current applied to the light-emitting diode 135B is increased in response to a signal from the constant voltage control circuit 159. Then, current applied to the phototransistor 135A is increased and current applied to the FB terminal is also increased. When the current of the FB terminal is increased, voltage inputted to the comparator 108 decreases, thereby reducing drain current applied to the switching element 101. With such a negative feedback, the output voltage Vo is stabilized.

Current applied to the primary auxiliary winding 140D is rectified and smoothed by the diode 131 and the capacitor 132, is utilized as the auxiliary power supply of the semiconductor device 130, and feeds current to the VCC terminal. Once the VCC reaches the starting voltage, the switch 102A in the regulator 102 is turned off. Thus, the current of the semiconductor device 130 is fed from the primary auxiliary winding 140D after startup. The polarity of the primary auxiliary winding 140D is the same as the secondary winding 140C and thus the VCC has a voltage proportionate to the output voltage Vo.

Current applied to the secondary auxiliary winding 140B is rectified and smoothed by the diode 150 and the capacitor 151 and is utilized as the power supply of the secondary control circuit 158 and the light-emitting diode 135B. The polarity of the secondary auxiliary winding 140B is the same as the primary winding 140A and thus the secondary auxiliary winding has a voltage proportionate to the input voltage VIN.

After the output voltage Vo is stabilized, the output current Io applied to the load 157 is increased. When current applied to the output current detection resistor 156 reaches a given value, the constant current control circuit 160 is operated to increase current applied to the light-emitting diode 135B. Then, current applied to the phototransistor 135A is increased and current applied to the FB terminal is also increased. When the current of the FB terminal is increased, voltage inputted to the comparator 108 decreases, thereby reducing drain current applied to the switching element 101. With such a negative feedback, control is performed so as to have a constant output current. Thus, in the case of a negative current equal to or higher than a given current, a constant-current drooping characteristic is obtained with a constant output current and a reduced output voltage.

When a load is further applied, the output voltage Vo is further reduced. At this point of time, a primary auxiliary winding voltage VCC is also reduced. Then, at a voltage equal to or lower than a stop voltage set by the start/stop circuit 107, the switching operation of the switching element 101 is stopped. Then, the switch 102A in the regulator 102 is brought into conduction again. Thus, starting current is applied by the starting constant-current source 103 and the VCC increases again. When the VCC reaches a starting voltage set by the start/stop circuit 107, the switching operation of the switching element 101 is resumed. Then, the switch 102A in the regulator 102 is turned off. When the VCC decreases and reaches the stop voltage, the switching operation is stopped. Namely, in an overload state having a short-circuit load and so on, an intermittent oscillation occurs which repeats the switching operation and the stopping operation. Therefore, the output current voltage char acteristic of FIG. 4 is illustrated as FIG. 9 where an intermittent oscillation occurs when an output voltage droops to a given voltage or below.

FIG. 6 shows a variation of FIG. 4. FIG. 6 is different from FIG. 4 only in the polarity of a primary auxiliary winding 140E. A primary auxiliary winding voltage VCC is proportionate to an input voltage VIN.

Referring to FIG. 7, the operations of a switching power supply configured as FIG. 6 will be described below. FIG. 7 is a time chart for explaining the operation waveforms of the above-described parts of FIG. 6.

The operations of FIG. 6 are different from those of FIG. 4 only in the event of an overload and thus the explanation of normal operations is omitted.

In the event of an overload, an output voltage Vo is reduced, whereas the primary auxiliary winding voltage VCC is not reduced. Thus, the switching operation of a semiconductor device 130 is continued. For this reason, even in the event of a short-circuit load, a current determined by a secondary current limiting resistor 156 is applied. Therefore, the output current voltage characteristic of FIG. 6 is illustrated as FIG. 10 where an output voltage droops while a constant current is maintained.

In general a switching power supply requires a protecting function for a short-circuit load. It is desired that short-circuit load current be minimized so as to prevent a switching power supply component from generating heat or being damaged even when the short circuit of the load is continued. Hence, the primary side normally has an overcurrent protecting function for stopping a switching operation when current applied to a switching element becomes equal to or higher than a given current.

However, a switching power supply for a charger has to be constituted by a secondary measurement current control circuit for charging a battery with a constant current. Further, when the secondary measurement current control circuit is operated, that is, when a constant current droops, the overcurrent protecting function on the primary side is not performed.

Therefore, the switching power supply for a charger cannot effectively perform the function of overcurrent protection on the primary side in the event of a short-circuit load. The conventional switching power supply for a charger that is shown in FIG. 4 causes an intermittent oscillation in the event of a short-circuit load but has a large load current applied during the oscillating period of the intermittent oscillation, resulting in an insufficient protecting function for a short-circuit load.

Moreover, in the conventional switching power supply of FIG. 6, a current with a short-circuit load is equal to a drooping current value. Thus, it is not possible to reduce a short-circuit load current.

Hence, in order to reduce the short-circuit load current of the switching power supply for a charger, it is necessary to provide another short-circuit load protection circuit on the secondary side, increasing the cost and the number of components.

DISCLOSURE OF THE INVENTION

An object of the present invention is to provide a switching power supply having an overcurrent protection characteristic with a small number of components whereby an output current is reduced when an output voltage becomes equal to or lower than a given voltage.

A switching power supply according to a first invention of the present invention comprises: a transformer; a switching element which has an input terminal connected to a first primary winding of the transformer and is fed with a first direct-current voltage via the transformer; an output voltage generation circuit which is connected to a secondary winding of the transformer, and rectifies and smoothes a secondary output voltage of the transformer, whereby a second direct-current voltage smaller than an absolute value of the first direct-current voltage is generated from the first direct-current voltage and the second direct-current voltage is outputted; an output voltage control circuit for stabilizing the output voltage; a control signal transmission circuit for transmitting a signal of the output voltage control circuit to the primary side; a control circuit for controlling an operation of the switching element; and an auxiliary power supply voltage generation circuit which is connected to an auxiliary winding of the transformer, generates a primary output voltage proportionate to the secondary output voltage, and rectifies and smoothes the generated primary output voltage so that an auxiliary power supply voltage for feeding a power supply voltage to the control circuit is generated and outputted, wherein the control circuit comprises a regulator which generates the power supply voltage of the control circuit from the first direct-current voltage and the auxiliary power supply voltage and feeds the generated power supply voltage, an oscillation circuit which generates and outputs a switching signal to be applied to the switching element, a current detection circuit which detects a current flowing through the switching element and outputs the detected current as an element current detection signal, a feedback signal control circuit for outputting a signal from the control signal transmission circuit as a feedback signal, a comparator which compares the element current detection signal and the feedback signal and outputs a comparison signal after comparison, a switching signal control circuit for controlling a current amount and an output of the switching signal based on the comparison signal, a clamping circuit for fixing the maximum value of the element current detection signal, and a clamp voltage variable circuit for changing the clamp voltage of the clamp circuit according to a voltage value of the auxiliary power supply voltage, wherein the clamp voltage variable circuit outputs to the oscillation circuit an oscillation frequency reduction signal to reduce an oscillation frequency of the oscillation circuit when the clamp voltage is lower than a given value. With this configuration, operations are performed so that overcurrent protection is operated, an oscillation frequency is reduced, and an output current is reduced in the event of a short-circuit load, thereby reducing a current in the event of a short-circuit load.

A switching power supply source according to a second invention of the present invention is such that the regulator operates to feed power from the auxiliary power supply voltage to the control circuit, and the regulator feeds power from the first direct-current voltage to the control circuit when the auxiliary power supply voltage is lower than a given value. With this configuration, even when the auxiliary winding voltage is reduced in the event of a short-circuit load, power is fed to the control circuit. Thus, an operation can be continued with stability.

A switching power supply according to a third invention of the invention is such that the clamp voltage variable circuit operates when the auxiliary power supply voltage is equal to or lower than a given value, and the clamp voltage decreases according as the auxiliary power supply voltage becomes lower. With this configuration, as an auxiliary winding voltage becomes lower, the overcurrent protection value of the switching element decreases, thereby reducing the overcurrent protection value and an output current in the event of a short-circuit load.

A switching power supply according to a fourth invention of the present invention is such that the clamp voltage variable circuit fixes a clamp voltage at the maximum value until the oscillation frequency reduction signal is outputted, and the clamp voltage decreases concurrently with the output of the oscillation frequency reduction signal. With this configuration, when the output voltage droops, the oscillation frequency decreases and then the overcurrent protection value of the switching element become lower. Hence, a point where an output current starts decreasing does not affect variations in overcurrent protection value and thus a setting is made with ease.

A switching power supply according to a fifth invention of the present invention is such that the switching element and the control circuit are located on a same semiconductor substrate, and the switching power supply further comprises a semiconductor device composed of six terminals of an input terminal and an output terminal of the switching element, an auxiliary power supply voltage input terminal, a power supply voltage terminal of the control circuit, an input terminal of the feedback signal, and an input terminal of the clamp voltage variable circuit. With this configuration, the number of components can be reduced in the switching power supply, thereby reducing the size and weight of the switching power supply.

A switching power supply according to a sixth invention of the present invention is such that the clamp voltage variable circuit decreases in clamp voltage according as the auxiliary winding voltage becomes lower, and the minimum value of the clamp voltage is set at about 10% of the maximum clamp voltage. With this configuration, an output current can be sufficiently reduced in the event of a short-circuit load.

A switching power supply according to a seventh invention of the present invention is such that the oscillation circuit is reduced in oscillation frequency to about one fifth of a normal oscillation frequency when the oscillation frequency reduction signal is inputted, so that an output current can be sufficiently reduced in the event of a short-circuit load.

As described above, the switching power supply of the present invention can reduce an output current in the event of a short-circuit load and realize quite an excellent function of short-circuit load protection. Further, even when a secondary measurement current control circuit is configured which is necessary for the switching power supply for a charger, the function of overcurrent protection is operated and a short-circuit load current can be reduced in the event of a short-circuit load, thereby eliminating the necessity for additional components.

DESCRIPTION OF THE EMBODIMENT

Figure 1:
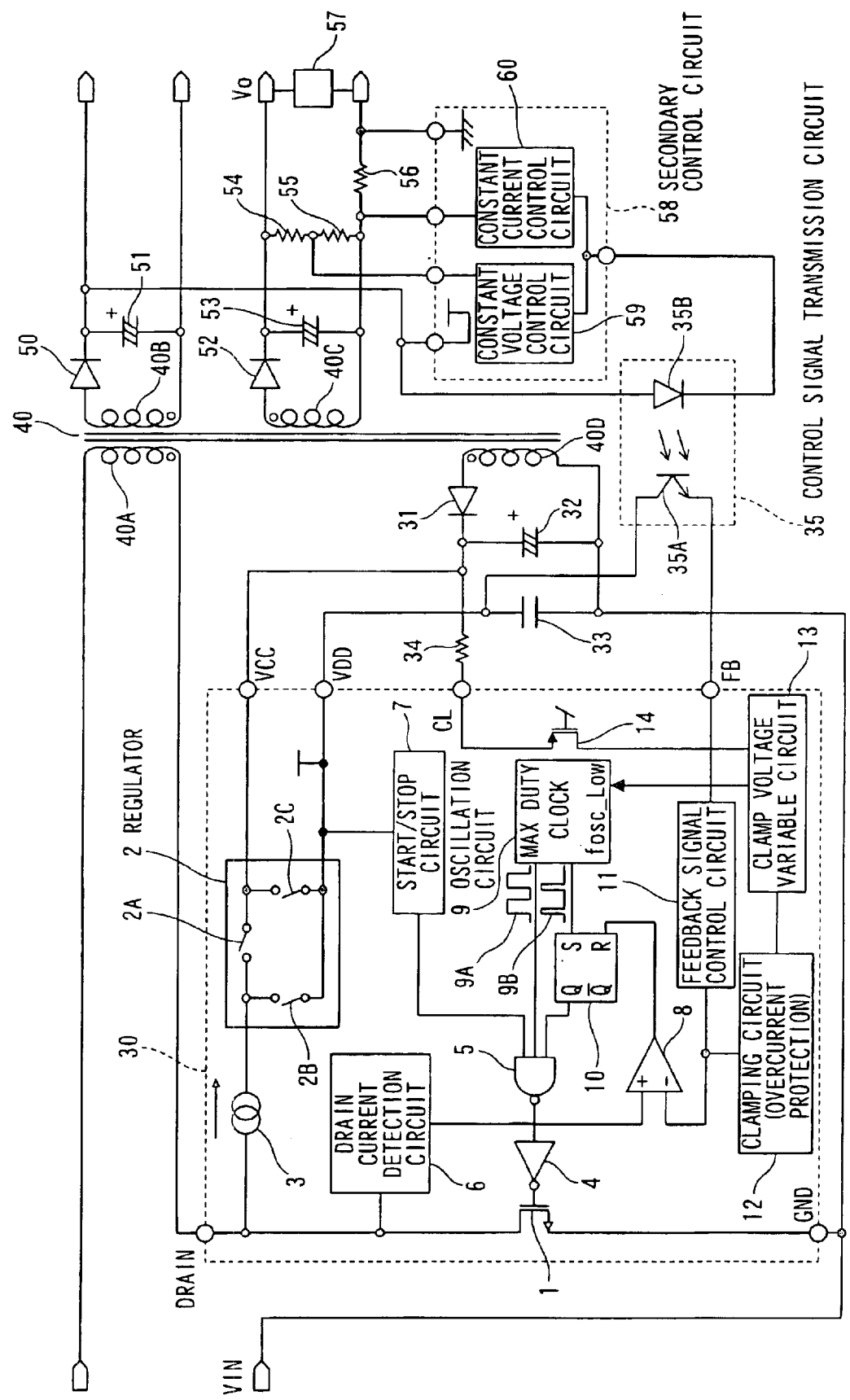
FIG. 1 is a circuit diagram showing an example of a switching power supply according to the present invention.

The following will discuss examples of the present invention in accordance with the accompanying drawings. FIG. 1 is a circuit diagram showing an example of a switching power supply according to the present invention.

In FIG. 1, reference numeral 30 denotes a semiconductor device for controlling the switching power supply. The semiconductor device is constituted by a switching element 1 and a control circuit thereof.

Further, the semiconductor device 30 comprises, as external input terminals, six terminals of the input terminal (DRAIN) of the switching element 1, an auxiliary power supply voltage input terminal (VCC), an internal circuit power supply terminal (VDD), a feedback signal input terminal (FB), an overcurrent protection value variable terminal (CL), and a GND terminal (GND) of the control circuit that serves as the output terminal of the switching element 1.

Reference numeral 2 denotes a regulator for feeding the internal circuit power supply of the semiconductor device 30. The regulator 2 is constituted by a switch 2A for applying starting current to the VCC, a switch 2B for applying starting current to the VDD, and a switch 2C for feeding current from the VCC to the VDD.

Reference numeral 3 denotes a starting constant-current source for feeding starting circuit current. The constant current source 3 feeds starting current to the VCC via the switch 2A upon startup. When the VCC has a voltage equal to or lower than a given voltage after startup, circuit current is fed to the VDD via the switch 2B.

Reference numeral 7 denotes a start/stop circuit for controlling start/stop of the semiconductor device 30. The start/stop circuit 7 detects the voltage of the VDD and outputs a signal for stopping the switching operation of the switching element 1 to a NAND circuit 5 when the VDD has a voltage equal to or lower than a given voltage.

Reference numeral 6 denotes a drain current detection circuit for detecting a current applied to the switching element 1. The detection circuit 6 converts a detected current into a voltage signal and outputs the signal to a comparator 8.

Reference numeral 11 denotes a feedback signal control circuit which converts a current signal inputted to the FB terminal into a voltage signal and outputs the signal to the comparator 8. The comparator 8 outputs a signal to the reset terminal of an RS flip-flop circuit 10 when an output signal from the feedback signal control 11 and an output signal from the drain current detection circuit 6 are equal to each other.

Reference numeral 12 denotes a clamping circuit for determining the maximum value of an output signal from the feedback signal control circuit 11. The clamping circuit 12 determines the maximum value of current applied to the switching element 1 and performs the function of overcurrent protection for the switching element 1.

Reference numeral 13 denotes a clamp voltage variable circuit for changing the clamp voltage of the clamping circuit 12. When current applied from the CL terminal to a P-type MOSFET 14 is increased, a clamp voltage is increased by the clamp voltage variable circuit 13. That is, when a current applied to the CL terminal is increased, the overcurrent protection level of the switching element 1 becomes higher. Further, when a current fed from the CL terminal through the P-type MOSFET 14 is equal to or lower than a given value, an oscillation frequency reduction signal is outputted to an oscillation circuit 9. The P-type MOSFET 14 is a device which applies current from the CL terminal to the clamp voltage variable circuit 13 and fixes the voltage of the CL terminal at a constant value. The drain of the MOSFET 14 is connected to the clamping circuit, the gate of the MOSFET 14 is connected to a reference voltage source, and the source of the MOSFET 14 is connected to the CL terminal. The clamp voltage variable circuit is configured so that a clamp voltage is reduced as auxiliary winding voltage becomes lower and the clamp voltage has the minimum value equivalent to about 10% of the maximum clamp voltage.

Reference numeral 9 denotes an oscillation circuit which outputs a maximum duty cycle signal 9A for determining the maximum duty cycle of the switching element 1 and a clock signal 9B for determining an oscillation frequency of the switching element 1. When the oscillation frequency reduction signal is inputted from the clamp voltage variable circuit 13, the oscillation frequency is reduced. The maximum duty cycle signal 9A is inputted to the NAND circuit 5 and the clock signal 9B is inputted to the set terminal of the RS flip-flop circuit 10. Besides, the oscillation frequency of the oscillation circuit is reduced to about one fifth of a normal oscillation frequency when the oscillation frequency reduction signal is input.

The output signal of the start/stop circuit 7, the maximum duty cycle signal 9A, and the output signal of the RS flip-flop circuit 10 are inputted to the NAND circuit 5. The output signal of the NAND circuit 5 is inputted to a gate drive circuit 4 to control the switching operation of the switching element 1. A switching signal control circuit is constituted by the gate drive circuit 4, the NAND circuit 5, and the RS flip-flop circuit 10.

Reference numeral 40 denotes a transformer which has a primary winding 40A, a secondary winding 40C, a secondary auxiliary winding 40B, and a primary auxiliary winding 40D.

A rectifying/smoothing circuit constituted by a diode 31 and a capacitor 32 is connected to the primary auxiliary winding 40D, and is utilized as the auxiliary power supply (auxiliary power supply voltage generation circuit) of the semiconductor device 30. Input is made to the VCC. Reference numeral 33 denotes a capacitor for stabilizing the VDD. Reference numeral 35 denotes a control signal transmission circuit for transmitting a control signal from the secondary side to the primary side. The transmission circuit 35 is constituted by a phototransistor 35A and a light-emitting diode 35B. The collector of the phototransistor 35A is connected to the VDD and the emitter of the phototransistor 35A is connected to the FB. A resistor 34 connects the VCC and the CL, and a current corresponding to the voltage of the VCC is applied to the CL terminal.

A rectifying/smoothing circuit (output voltage generation circuit) constituted by a diode 52 and a capacitor 53 is connected to the secondary winding 40C. The rectifying/smoothing circuit is further connected to a load 57. A rectifying/smoothing circuit constituted by a diode 50 and a capacitor 51 is connected to the secondary auxiliary winding 40B and feeds current to the light-emitting diode 35B and a secondary control circuit 5B. The secondary control circuit 58 (output voltage control circuit) is constituted by a constant-voltage control circuit 59 and a constant-current control circuit 60. The constant-voltage control circuit 59 is fed with voltage divided by detection resistors 54 and 55 of secondary output voltage Vo and controls a current applied to the light-emitting diode 35B so as to have a constant secondary output voltage Vo. The constant-current control circuit 60 operates when a current applied to an output current detection resistor 56 becomes equal to or higher than a give value, and the constant-current control circuit 60 controls a current applied to the light-emitting diode 35B so as to have a constant output current Io.

Figure 3:
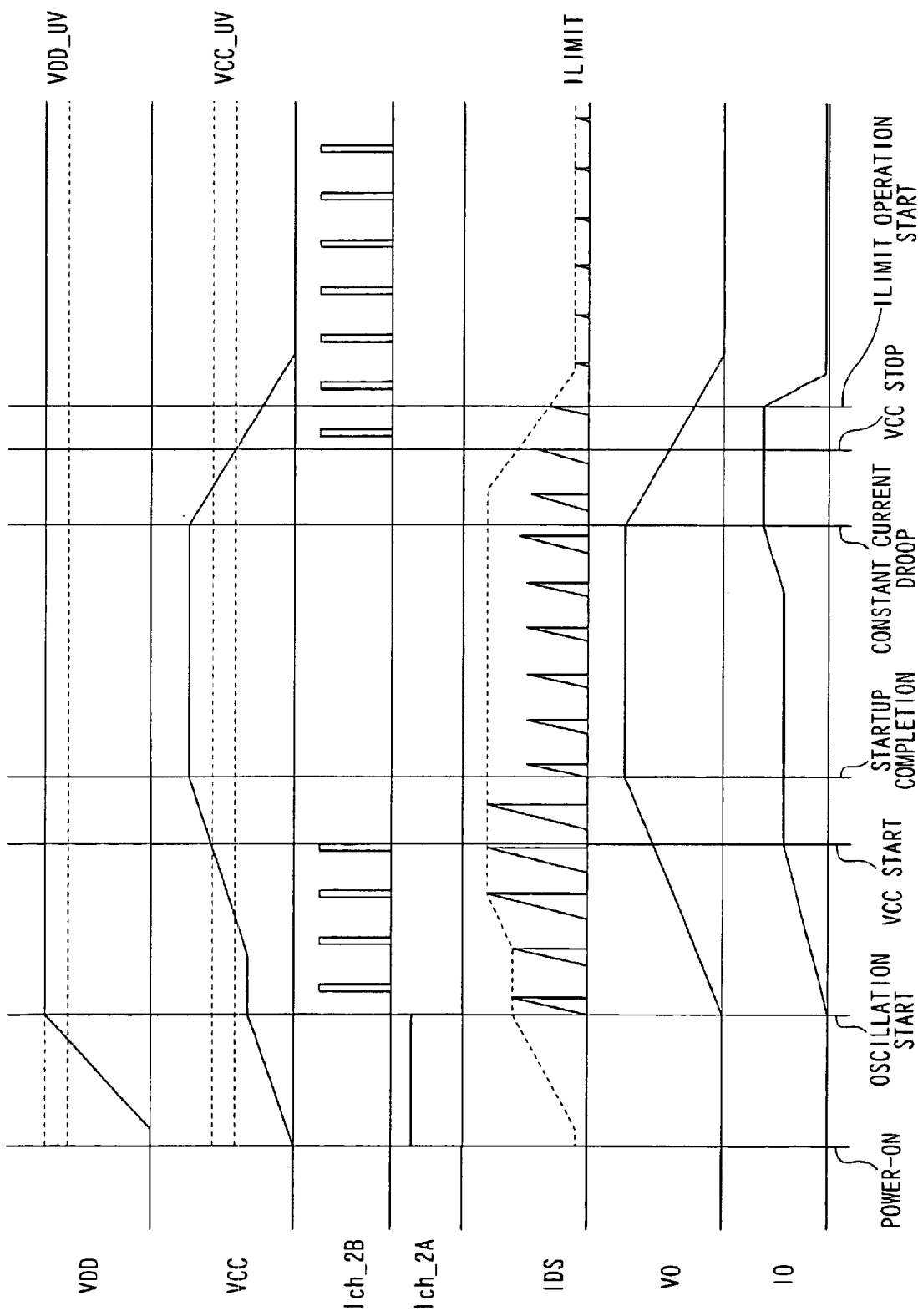
FIG. 3 is a time chart for explaining the operations of the switching power supply according to the present invention.
Figure 4:
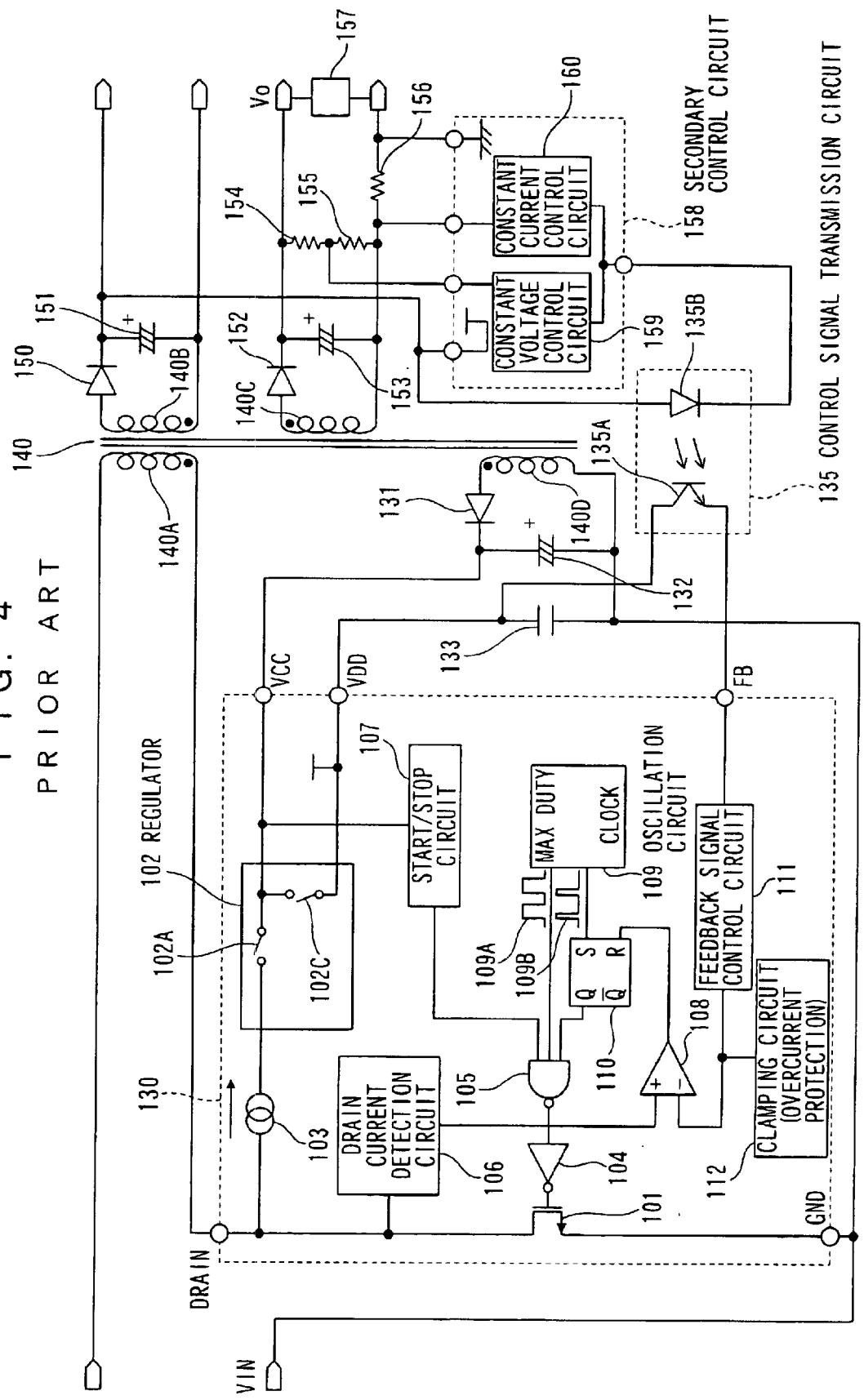
FIG. 4 is a circuit diagram showing an example of a conventional switching power supply.
Figure 5:
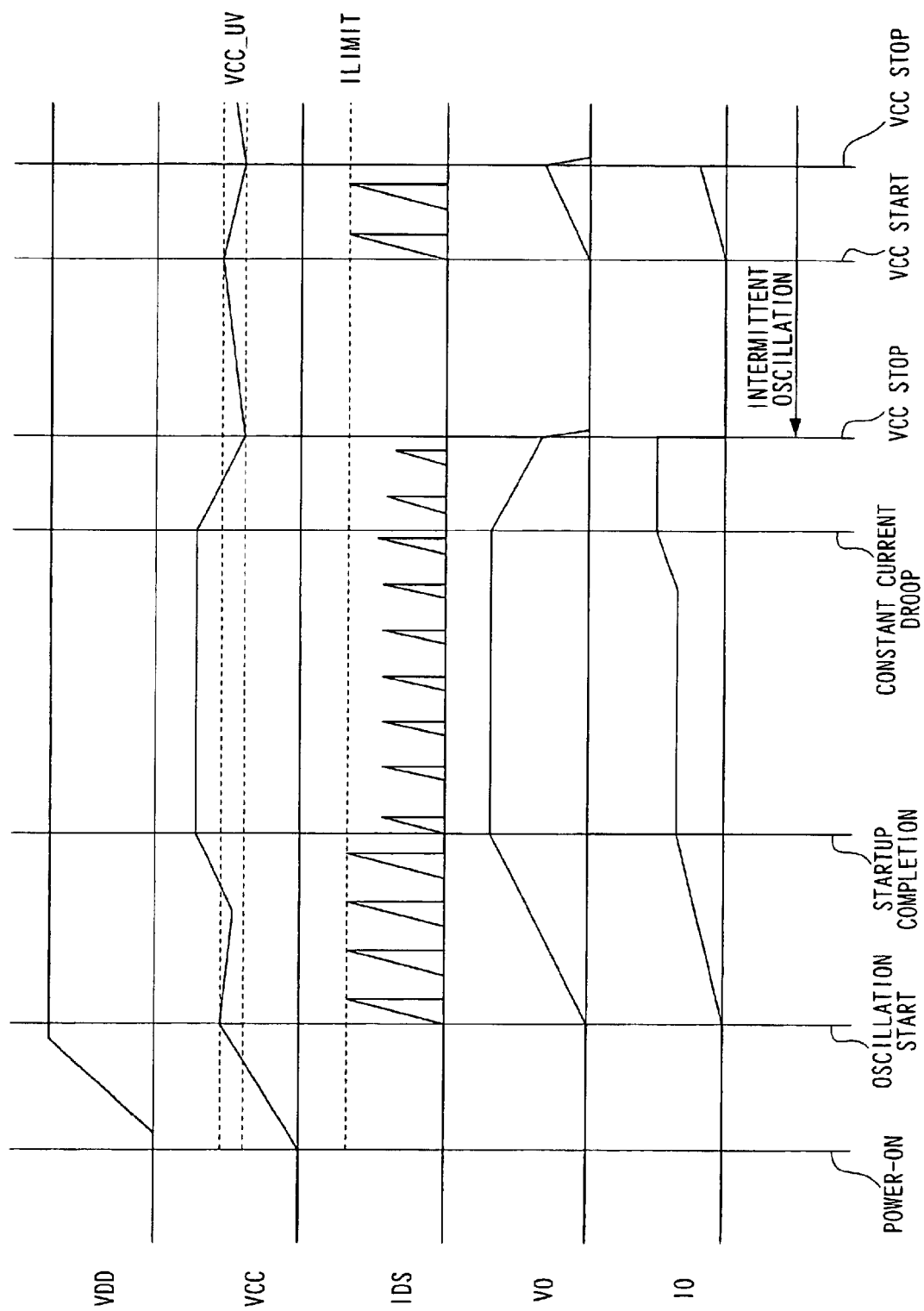
FIG. 5 is a time chart for explaining the operations of the switching power supply.
Figure 6:
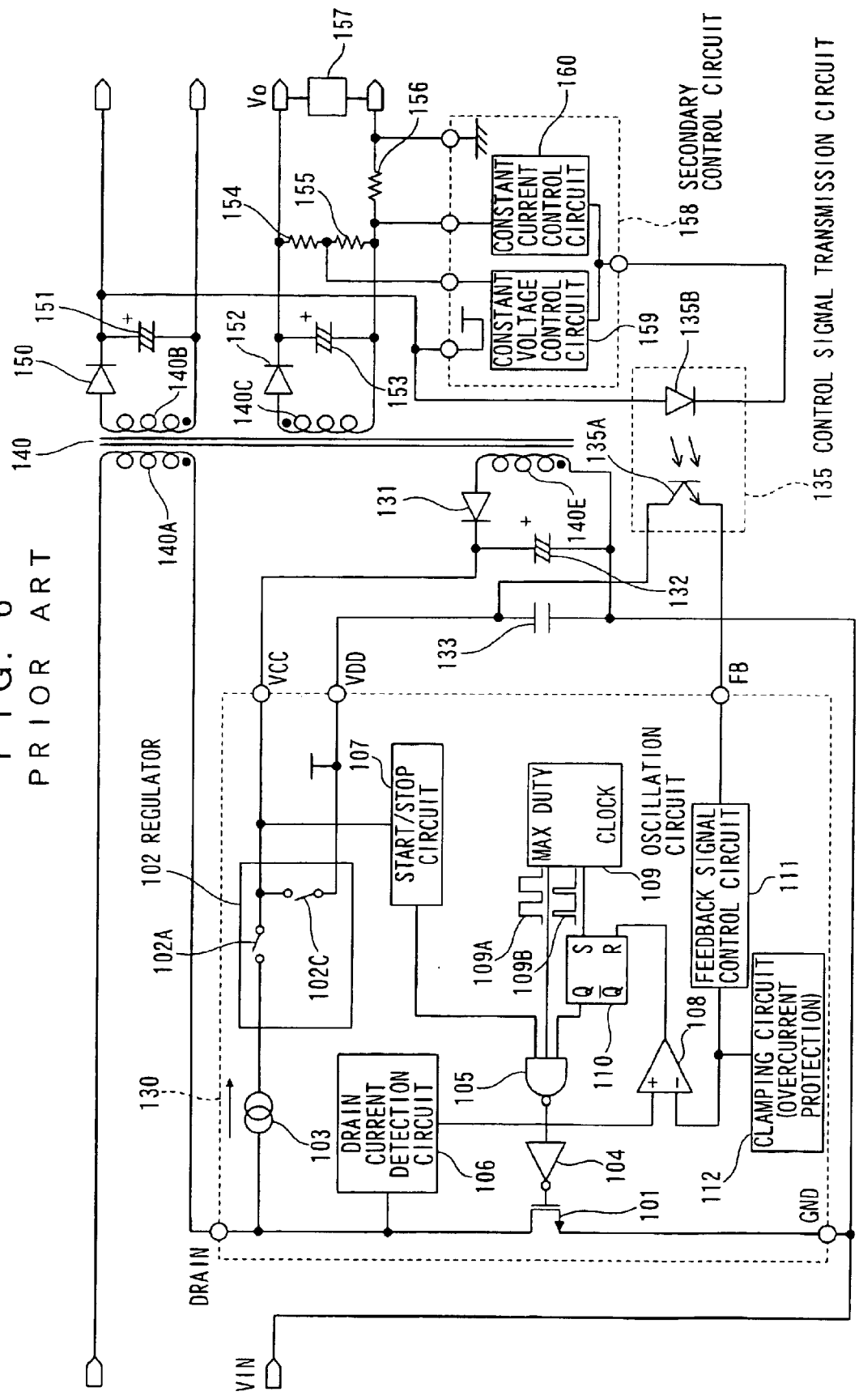
FIG. 6 is a circuit diagram showing another example of the conventional switching power supply.
Figure 7:
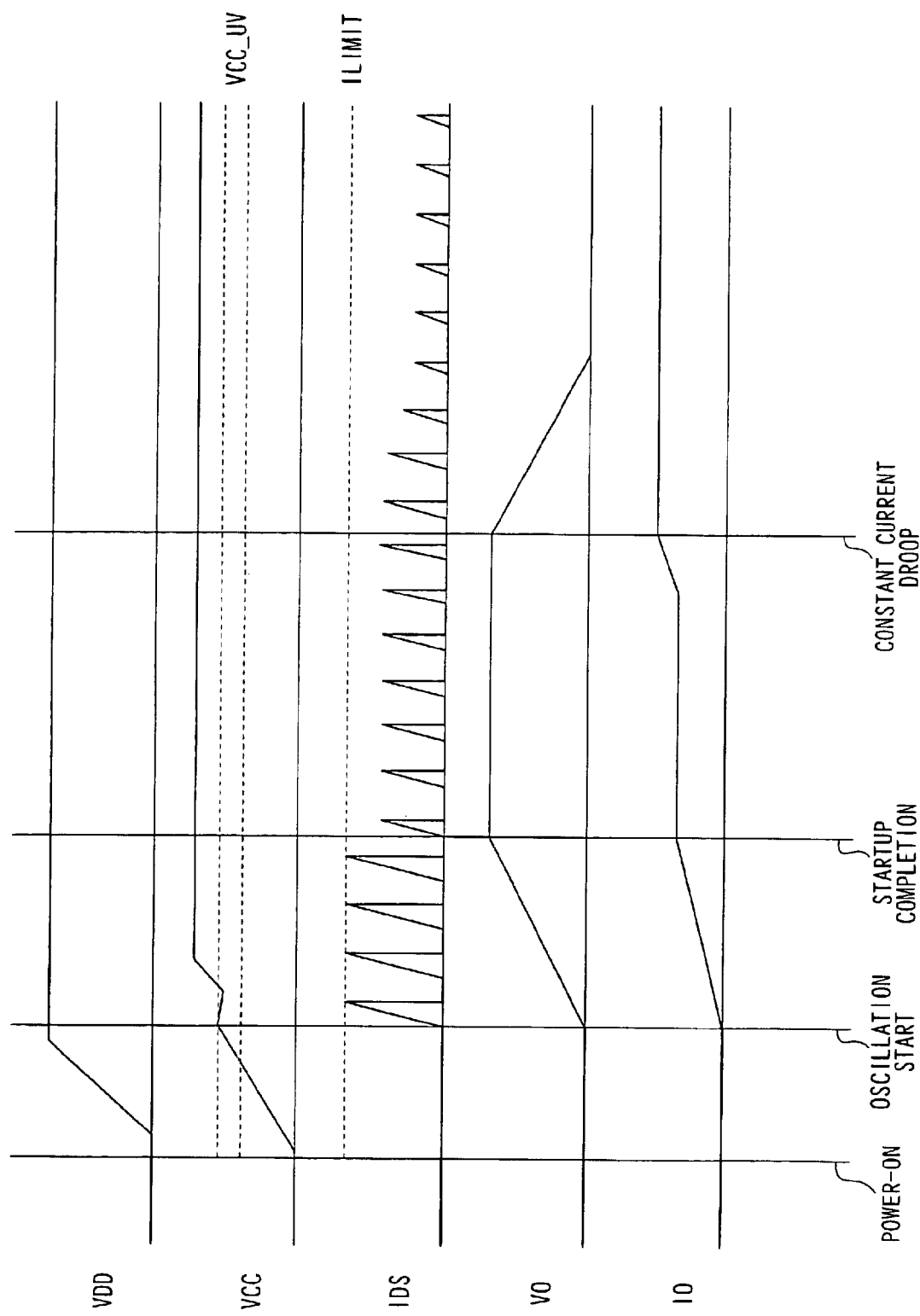
FIG. 7 is a time chart for explaining the operations of the switching power supply.

Referring to FIGS. 1 and 3, the operation soft of the switching power supply configured thus will be described below. FIG. 3 is a time chart for explaining the operating waveforms of the above-described parts of FIG. 1.

In FIG. 1, a direct-current voltage VIN generated by performing rectification and smoothing on, for example, a commercial alternating-current power supply is inputted to the input terminals. The VIN is applied to the DRAIN terminal of the semiconductor device 30 via the primary winding 40A of the transformer 40. Then, starting current generated by the starting constant-current source 3 is applied to charge the capacitor 32 via the switch 2A in the regulator 2, increasing the voltage of the VCC. The switch 2C in the regulator 2 operates so that the VDD has a constant voltage. Thus, some of the starting current charges the capacitor 33, which is connected to the VDD, via the switch 2C and increases the voltage of the VDD. After startup, the switch 2B in the regulator 2 is brought into conduction during the off period of the switching operation when the VCC voltage is equal to or lower than a given value immediately after startup and in the event of an overload, so that the VDD is not reduced even when the VCC voltage is insufficient.

When the VCC and the VDD are increased and the VDD reaches the starting voltage set by the start/stop circuit, the switching operation of the switching element 1 is started. When the switching operation is started, energy is supplied to the windings of the transformer 40 and thus current is applied to the secondary winding 40C, the secondary auxiliary winding 40B, and the primary auxiliary winding 40D.

Current applied to the secondary winding 40C is rectified and smoothed by the diode 52 and the capacitor 53 into direct-current power, which supplies power to the load 57. The output voltage Vo is gradually increased by repeating the switching operation. When the output voltage reaches a voltage set by the output voltage detection resistors 54 and 55, current applied to the light-emitting diode 35B is increased in response to a signal from the constant-voltage control circuit 59. Then, current applied to the phototransistor 35A is increased and current applied to the FB terminal is also increased. When the current of the FB terminal is increased, voltage inputted to the comparator 8 decreases, thereby reducing drain current applied to the switching element 1. With such a negative feedback, the output voltage Vo is stabilized.

Current applied to the primary auxiliary winding 40D is rectified and smoothed by the diode 31 and the capacitor 32, is utilized as the auxiliary power supply of the semiconductor device 30, and feeds current to the VCC terminal. Once the VCC reaches the starting voltage, the switch 2A in the regulator 2 is turned off. Thus, the current of the semiconductor device is fed from the primary auxiliary winding 40D after startup. The polarity of the primary auxiliary winding 40D is the same as the secondary winding 40C and thus the VCC has a voltage proportionate to the output voltage Vo. However, when the voltage of the VCC is equal to or lower than a given voltage, since the switch 2B in the regulator 2 can be brought into conduction, the starting current is fed to the VDD via the switch 2B at this point of time, so that the VDD is stabilized.

Current applied to the secondary auxiliary winding 40B is rectified and smoothed by the diode 50 and the capacitor 51 and is utilized as the power supply of the secondary control circuit 58 and the light-emitting diode 35B. The polarity of the secondary auxiliary winding 40B is the same as the primary winding 40A and thus the secondary auxiliary winding has a voltage proportionate to the input voltage VIN.

After the output voltage Vo is stabilized, the output current Io applied to the load 57 is increased. When current applied to the output current detection resistor 56 reaches a given value, the constant-current control circuit 60 operates to increase current applied to the light-emitting diode 35B. Then, current applied to the phototransistor 35A is increased and current applied to the FB terminal is also increased. When the current of the FB terminal is increased, voltage inputted to the comparator 8 decreases, thereby reducing drain current applied to the switching element 1. With such a negative feedback, control is performed so as to have a constant output current. Thus, in the case of a negative current equal to or higher than a given value, a constant-current drooping characteristic is obtained with a constant output current and a reduced output voltage.

Figure 8:
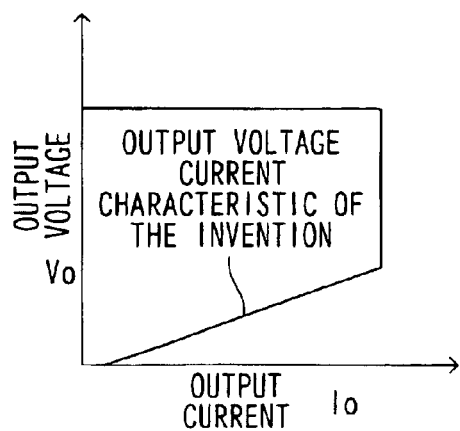
FIG. 8 is an output voltage current characteristic diagram of the switching power supply according to the present invention.
Figure 9:
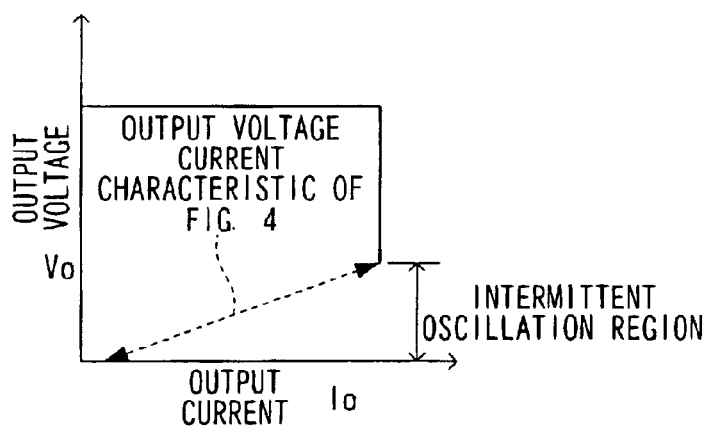
FIG. 9 is an output voltage current characteristic diagram of the conventional switching power supply.
Figure 10:
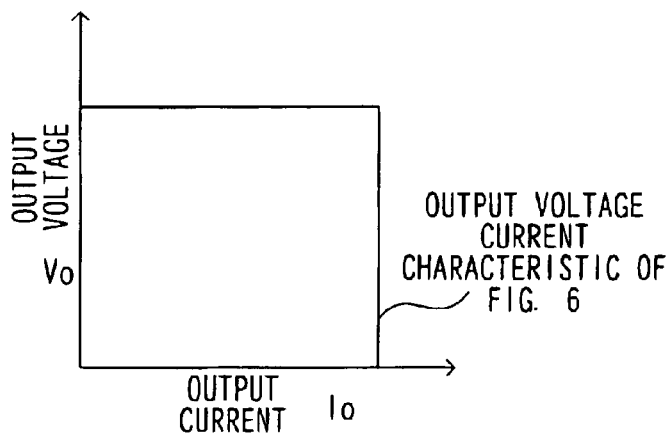
FIG. 10 is an output voltage current characteristic diagram of another conventional switching power supply.

When a load is further applied, the output voltage Vo further decreases. At this point of time, a primary auxiliary winding voltage VCC also decreases. When the VCC decreases, current applied to the CL terminal via the resistor 34 decreases accordingly. Then, the clamp voltage of the clamping circuit 12 is reduced by the clamp voltage variable circuit 13. Thus, as the Vo and the VCC become lower, the switching element 1 is reduced in overcurrent protection value. Hence, when the Vo and the VCC are reduced to a certain output voltage, the switching element 1 is placed into a state of overcurrent protection, goes out of constant-current droop of output, and has an output current smaller than a drooping constant-current value. Further, an oscillation frequency reduction signal is outputted from the clamp voltage variable circuit 13 to the oscillation circuit 9 and thus the oscillation frequency of the oscillation circuit 9 becomes lower. Since the output current is rapidly reduced, the output voltage current characteristic of FIG. 1 is indicated by the current interrupting locus of FIG. 8. When the output voltage Vo droops to a certain voltage or below, a VI characteristic declining from right to left is obtained with a reduced output current Io.

Figure 2:
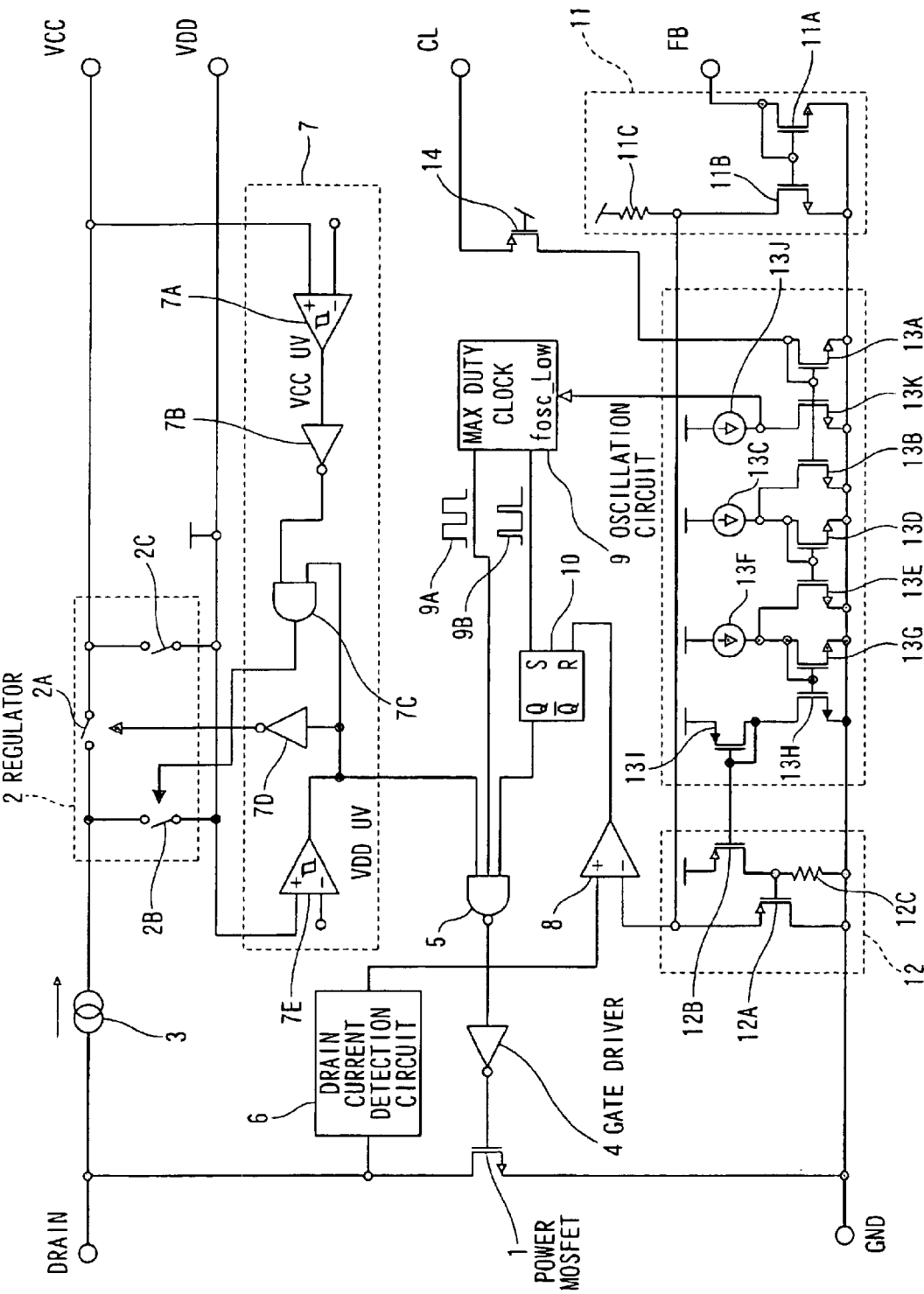
FIG. 2 is a circuit diagram showing an example of a semiconductor device constituting the switching power supply of the present invention.

FIG. 2 is a circuit diagram showing an example of a semiconductor device for controlling the switching power supply. The semiconductor device constitutes the switching power supply of the present invention. FIG. 2 shows the detail of the internal circuit of the semiconductor device 30 shown in FIG. 1. The reference numerals of FIG. 2 correspond to those of FIG. 1 and thus the explanation of the same constituent elements is omitted.

In FIG. 2, a start/stop circuit 7 is constituted by a VCC comparator 7A, inverters 7B and 7D, an AND circuit 7C, and a VDD comparator 7E. The VCC comparator 7A compares the voltage of VCC and the reference voltage and outputs a signal to the inverter 7B. The VDD comparator 7E compares the voltage of the VDD and the reference voltage and outputs a signal to a NAND circuit 5, the AND circuit 7C, and the inverter 7D. The inverter 7B outputs a signal to the AND circuit 7C. A switch 2B is controlled by the output of the AND circuit 7C and a switch 2A is controlled by the output of the inverter 7D.

The following will discuss the operations of the start/stop circuit 7 configured thus. Before startup, the output of the VCC comparator 7A is set at a low level and the output of the VDD comparator 7E is set at a low level, so that the switch 2A is turned on and the switch 2B is turned off in a regulator 2. Therefore, the starting current of a starting constant-current source 3 is applied to the VCC through the switch 2A. Further, a switch 2C operates so that the VDD has a constant value and thus the current passes through the switch 2C to the VDD upon startup. Then, when the voltage of the VDD reaches a VDD starting voltage set by the VDD comparator 7E, the output of the VDD comparator 7G is set at a high level, thereby enabling the switching operation of the switching element 1 and turning off the switch 2A. In the case where the voltage of the VCC is higher than the VCC starting voltage set by the VCC comparator 7A at this point of time, the output of the VCC comparator 7A is set at a high level, so that the output of the AND circuit 7C is set at a low level and the switch 2B is turned off. At the start of the VDD, when the voltage of the VCC is lower than the VCC starting voltage set by the VCC comparator 7A, the output of the VCC comparator 7A is set at a low level. Thus, the output of the AND circuit 7C is set at a high level and the switch 2B is turned on. Since the current of the VDD is fed from DRAIN or VCC after startup, even when the VCC decreases immediately after startup and in the event of an overload, the operation of the semiconductor device 30 never stops.

A feedback signal control circuit 11 is constituted by N-type MOSFETs 11A and 11B and a resistor 11C. The N-type MOSFETs 11A and 11B are current mirror circuits among which the N-type MOSFET 11A serves as the reference. The drain and gate of the N-type MOSFET 11A are connected to an FB terminal. The drain of the N-type MOSFET 11B is connected to the resistor 11C and serves as the minus input of a comparator 8. Another terminal of the resistor 11C is connected to the reference voltage.

The following will discuss the operations of the feedback signal control circuit 11 configured thus. When current is applied from the FB terminal, the current is applied to the N-type MOSFETs 11A and 11B and a voltage drop occurs across the resistor 11C according to the current. That is, as the current of the FB terminal becomes larger, the voltage drop of the resistor 11C increases, thereby reducing an input voltage to the comparator 8. Therefore, the input voltage of the comparator 8 is changed according to the magnitude of current of the FB terminal. As the current of the FB terminal becomes larger, current applied to the switching element 1 decreases.

A clamping circuit 12 is constituted by P-type MOSFETs 12A and 12B and a resistor 12C. The source of the P-type MOSFET 12A is connected to the output of the feedback signal control circuit 11 and serves as the minus input of the comparator 8. To the drain of the P-type MOSFET 12B, the drain of the P-type MOSFET 12A is connected via GND and the gate of the P-type MOSFET 12B is connected via the resistor 12C. The gate of the P-type MOSFET 12B is connected to the output of a clamp voltage variable circuit 13.

The following will discuss the operations of the clamping circuit 12 configured thus. Current applied to the P-type MOSFET 12B is changed by the output of the clamp voltage variable circuit 13 and causes a voltage drop on the resistor 12C. The P-type MOSFET 12A is brought into conduction when the output signal of the feedback signal control circuit 11 becomes equal to or higher than a voltage which is the sum of a voltage across the resistor 12C and the threshold voltage of the P-type MOSFET 12A, and the P-type MOSFET 12A operates so as to fix the voltage value. Therefore, in order to fix the maximum value of an output signal from the feedback signal control circuit 11, the P-type MOSFET 12A operates so as to perform the function of overcurrent protection for the switching element 1.

A clamp voltage variable circuit 13 is constituted by N-type MOSFETs 13A, 13B, 13D, 13E, 13G, 13H, and 13K, a constant-current source 13C for determining a minimum clamp voltage, a constant-current source 13F for determining a maximum clamp voltage, a constant-current source 13J for determining an oscillation frequency reduction level, and a P-type MOSFET 13I. The N-type MOSFETs 13A, 13B, and 13K are current mirror circuits among which the N-type MOSFET 13A serves as the reference. The drain and gate of the N-type MOSFET 13A are connected, as the input of the clamp voltage variable circuit 13, to the drain of the P-type MOSFET 14. The N-type MOSFETs 13D and 13E are current mirror circuits among which the N-type MOSFET 13D serves as the reference. The drain and gate of the N-type MOSFET 13D are connected to the constant-current source 13C for determining a minimum clamp voltage and the drain of the N-type MOSFET 13B. The N-type MOSFETs 13G and 13H are current mirror circuits among which the N-type MOSFET 13G serves as the reference. The drain and gate of the N-type MOSFET 13G are connected to the constant-current source 13F for determining a maximum clamp voltage and the drain of the N-type MOSFET 13E. The P-type MOSFET 13I and the P-type MOSFET 12B in the clamping circuit 12 are current mirror circuits among which the P-type MOSFET 13I serves as the reference. The drain and gate of the N-type MOSFET 13I are connected to the drain of the N-type MOSFET 13H. The drain of the N-type MOSFET 13K is connected to the constant-current source 13J for determining an oscillation frequency reduction level and outputs an oscillation frequency reduction signal to an oscillation circuit 9.

The following will discuss the operations of the clamp voltage variable circuit 13 configured thus. Current corresponding to the voltage of the VCC is applied from the CL terminal through the P-type MOSFET 14 to the N-type MOSFET 13A, and the same current as the N-type MOSFET 13A is applied to the N-type MOSFET 13B. The N-type MOSFET 13D is fed with a current obtained by subtracting the current value of the N-type MOSFET 13B from the current value of the constant-current source 13C for determining a minimum clamp voltage. The same current is applied to the N-type MOSFET 13E. The N-type MOSFET 13G is fed with a current obtained by subtracting the current value of the N-type MOSFET 13E from the current value of the constant-current source 13F for determining a maximum clamp voltage, and the same current is applied to the N-type MOSFET 13H. The current is applied to the P-type MOSFET 13I and serves as the reference current of the clamping circuit 12 for determining a clamp voltage.

When the VCC increases and the current of the CL terminal increases, the current of the 13A (13B) increases→the current of the 13D (13E) decreases→the current of the 13G (13H) increases. Thus, the current of the P-type MOSFET 13I increases and the clamping circuit 12 has a higher clamp voltage. Even when the CL terminal has quite a large current, the N-type MOSFET 13B is not fed with a current exceeding a current of the constant-current source 13C for determining a maximum clamp voltage. Hence, when the whole current of the constant-current source 13F for determining a clamp voltage is applied to the P-type MOSFET 13I, the maximum clamp voltage is obtained.

Conversely, when the VCC decreases and the current of the CL terminal decreases, the current of the 13A (13B) decreases→the current of the 13D (13E) increases→the current of the 13G (13H) decreases. Thus, the current of the P-type MOSFET 13I decreases and the clamping circuit 12 has a lower clamp voltage. When the current of the CL terminal becomes 0, the whole current of the constant-current source 13C for determining a maximum clamp voltage is applied to the N-type MOSFET 13D. Hence, the P-type MOSFET 13I is fed with a current obtained by subtracting the current of the constant-current source 13C for determining a minimum clamp voltage from the current of the constant-current source 13F for determining a maximum clamp voltage. At this point of time, the minimum clamp voltage is obtained.

Therefore, the current of the CL terminal changes the clamp voltage of the clamp circuit 12, that is, the overcurrent protection value of the switching element 1, so that the minimum value and the maximum value of a clamp voltage can be determined.

Further, a current corresponding to the voltage of the VCC is applied from the CL terminal through the P-type MOSFET 14 to the N-type MOSFET 13A and the same current as the N-type MOSFET 13A is applied to the N-type MOSFET 13K, so that the current is compared with the current of the constant-current source 13J for determining an oscillation frequency reduction level. When the current of the N-type MOSFET 13K is smaller than that of the constant-current source 13J, an oscillation frequency reduction signal is outputted to the oscillation circuit 9. Therefore, when the current of the CL terminal is smaller than the current set by the constant-current source 13J, an oscillation frequency decreases.

What is claimed is:

1. A switching power supply, comprising:

a transformer;

a switching element that has an input terminal connected to a first primary winding of the transformer and is fed with a first direct-current voltage via the transformer;

an output voltage generation circuit that is connected to a secondary winding of the transformer, and rectifies and smoothes a secondary output voltage of the transformer, whereby a second direct-current voltage smaller than an absolute value of the first direct-current voltage is generated from the first direct-current voltage and the second direct-current voltage is outputted;

an output voltage control circuit for stabilizing the second direct-current voltage;

a control signal transmission circuit for transmitting a signal of the output voltage control circuit to a primary side;

a control circuit for controlling an operation of the switching element; and an auxiliary power supply voltage generation circuit that is connected to an auxiliary winding of the transformer, generates a primary output voltage proportionate to the secondary output voltage and rectifies and smoothes the generated primary output voltage, whereby an auxiliary power supply voltage for feeding a power supply voltage to the control circuit is generated and outputted, said control circuit for controlling an operation of the switching element comprising:

a regulator for generating and feeding a power supply voltage of the control circuit from the first direct-current voltage and the auxiliary power supply voltage;

an oscillation circuit for generating and outputting a switching signal to be applied to the switching element;

a current detection circuit for detecting a current flowing through the switching element and outputting the detected current as an element current detection signal;

a feedback signal control circuit for outputting a signal from the control signal transmission circuit as a feedback signal;

a comparator for comparing the element current detection signal and the feedback signal, and outputting a comparison signal after comparison;

a switching signal control circuit for controlling a current amount and an output of the switching signal based on the comparison signal;

a clamping circuit for fixing a maximum value of the element current detection signal; and a clamp voltage variable circuit for changing a clamp voltage of the clamp circuit according to a voltage value of the auxiliary power supply voltage, wherein the clamp voltage variable circuit outputs to the oscillation circuit an oscillation frequency reduction signal for reducing an oscillation frequency of the oscillation circuit, when the clamp voltage is lower than a given value.

2. The switching power supply according to claim 1, wherein the regulator operates to feed power from the auxiliary power supply voltage to the control circuit, and the regulator feeds power from the first direct-current voltage to the control circuit when the auxiliary power supply voltage is lower than a given value.

3. The switching power supply according to claim 1, wherein the clamp voltage variable circuit operates when the auxiliary power supply voltage is equal to or lower than a given value, and the clamp voltage decreases according as the auxiliary power supply voltage lowers.

4. The switching power supply according to claim 1, wherein the clamp voltage variable circuit fixes a clamp voltage at a maximum value until the oscillation frequency reduction signal is outputted, and the clamp voltage decreases concurrently with an output of the oscillation frequency reduction signal.

5. The switching power supply according to claim 1, wherein the switching element and the control circuit are located on a same semiconductor substrate, and the switching power supply further comprises a semiconductor device comprising six terminals of an input terminal and an output terminal of the switching element, an auxiliary power supply voltage input terminal, a power supply voltage terminal of the control circuit, an input terminal of the feedback signal, and an input terminal of the clamp voltage variable circuit.

6. The switching power supply according to claim 1, wherein the clamp voltage variable circuit decreases in clamp voltage according as the auxiliary winding voltage lowers, and a minimum value of the clamp voltage is set at about 10% of a maximum value of the clamp voltage.

7. The switching power supply according to claim 1, wherein the oscillation circuit is reduced in oscillation frequency to about one fifth of a normal oscillation frequency when the oscillation frequency reduction signal is inputted.

* * * * *